E. M. HEYLMAN.
DISK PLOW.
APPLICATION FILED MAR. 14, 1918.
1,298,209.
Patented Mar. 25, 1919.
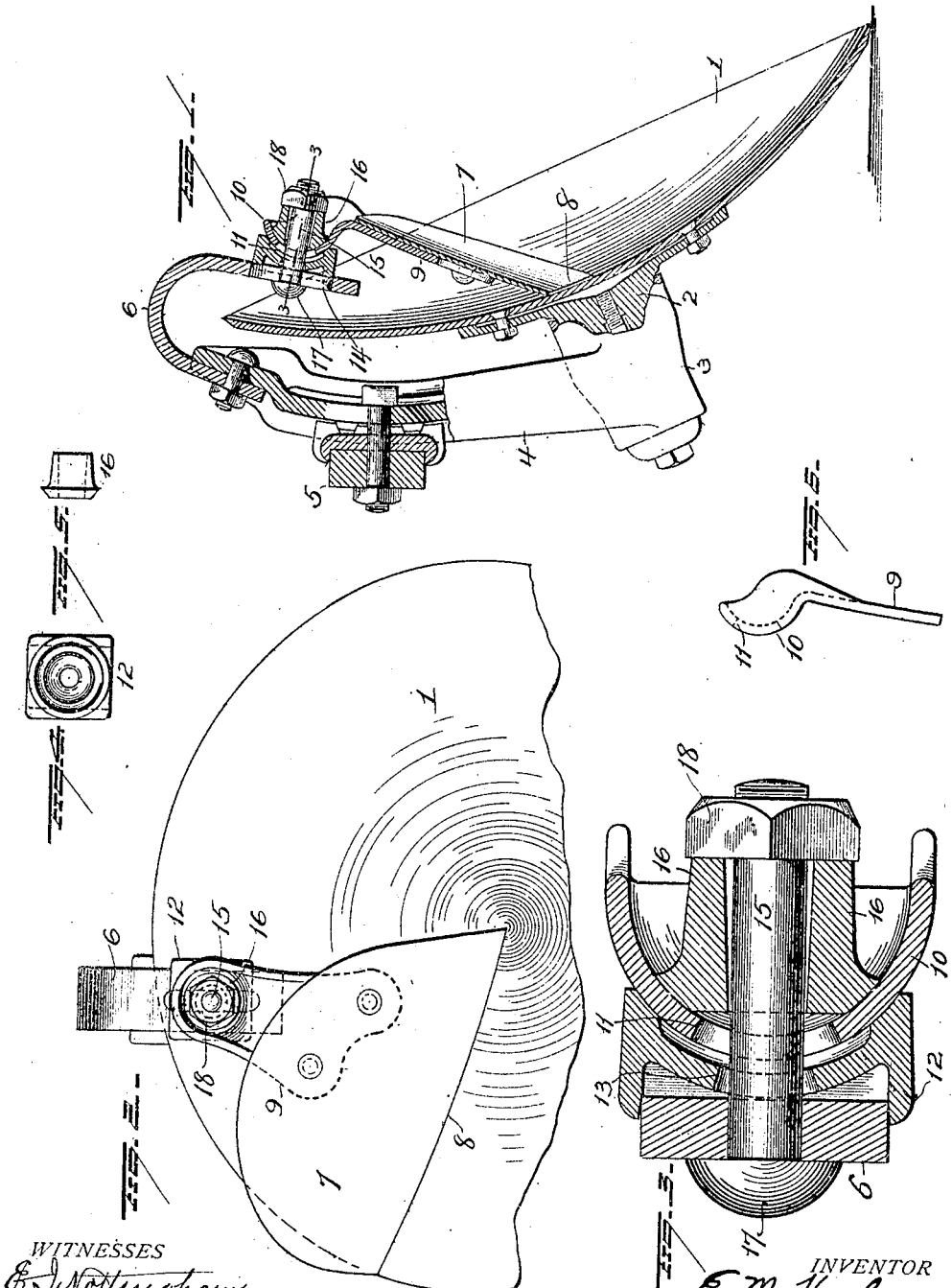

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

DISK PLOW.

1,298,209.   Specification of Letters Patent.   Patented Mar. 25, 1919.

Application filed March 14, 1918.   Serial No. 222,333.

*To all whom it may concern:*

Be it known that I, EDWARD M. HEYLMAN, a citizen of the United States, and resident of South Bend, in the county of St. Joseph and State of Indiana, have invented certain new and useful Improvements in Disk Plows; and I do hereby declare the following to be a full, clear, and exact description of the invention, such as will enable others skilled in the art to which it appertains to make and use the same.

This invention relates to improvements in disk plows, and more particularly to an improved scraper construction therefor,— one object of the invention being to so construct and mount a disk scraper that "dead" points along the edge of the scraper shall be avoided and so that the soil shall be all forced to the outer edge of the disk; the turning of the furrow slices rendered uniform, and the trash effectually covered.

A further object is to provide a scraper construction in which the cutting edge of the scraper will free itself of roots by the tendency to keep the same moving toward the outer end of said scraper at all times.

A further object is to provide simple and efficient means for mounting and effecting accurate adjustment of the scraper.

With these and other objects in view, the invention consists in certain novel features of construction and combinations of parts as hereinafter set forth and pointed out in the claims.

In the accompanying drawings; Figure 1 is a sectional view of a portion of a disk plow showing my improvements; Fig. 2 is a face view, partly broken away; Fig. 3 is an enlarged sectional view illustrating the adjustable mounting for the scraper, and Figs. 4, 5 and 6 are detail views of parts of said mounting.

1 represents the concavo-convex disk of an agricultural implement, such as a disk plow, and has secured thereto, a spindle 2 mounted in a hub 3,—the latter being provided with an arm 4 attached to a beam or other support indicated at 5.

A U-shaped arm or yoke 6 is secured at one end to the arm 4 and overhangs the concave face of the disk for adjustably supporting a scraper 7, as hereinafter more specifically explained.

The scraper 7 is made with a cutting edge 8 which conforms to the concave face of the disk 1 and extends directly from the center of the disk to its periphery, so that said cutting edge will, when viewed in front elevation as shown in Fig. 2, appear nearly straight from the center of the disk to its periphery. By thus forming, shaping and disposing the scraper, all the soil as well as roots will be forced to the outer edge of the disk; the turning of the furrow slices will be uniform and the trash will be effectually covered,—whereas, with scrapers such as heretofore employed, in which the cutting edge presents in front elevation a decided dip or curve, a dead point will be present at the deepest part of the curve and this will cause the roots to wrap around the cutting edge and remain there,—resulting in crowding the scraper away from the disk, and furthermore such former construction of scraper will cause a part of the soil to travel toward the center of the disk, and to travel forward and roll over before delivering the same to the furrow side of the disk.

In effecting the adjustable connection between the scraper and the arm or yoke 6, an arm 9 is securely fixed to the scraper 7 and on the upwardly projecting portion of this arm, a concavo-convex head 10 is formed and provided with an elongated slot 11. The concavo-convex head 10 of the arm 9 is seated in a dished block 12 having a hole 13, and said block rests against one face of the yoke 6. An elongated slot 14 is formed in the yoke 6 and through this slot, a bolt 15 is passed,—said bolt also passing through the hole 13 of block 12, the slot 11 of the head 10 and through a tapering sleeve 16 seated against the concave face of said head. One end of the bolt 15 is provided with a head 17 and its other end is threaded for the reception of a nut 18 which bears against the outer end of the sleeve 16.

When the nut 18 is tightened, the arm 9 of the scraper will be clamped, at the proper adjustment, to the yoke arm 6. By loosening said nut, the clamping devices may be moved bodily up or down to effect vertical adjustment of the scraper, or the head 10 of arm 9 may be turned horizontally to adjust the scraper relatively to the center and periphery of the disk-, or said head may be turned in a direction to adjust the scraper in a direction toward or away from the disk. Thus it will be seen that the coupling of the scraper arm to the yoke arm 6 is of a "universal" type so that any of the various adjustments of the scraper which may be desired, may be readily accomplished.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a concavo-convex soil engaging disk, and means for mounting the same, of a scraper having a scraping edge conforming to the concave contour of the disk and extending from the center of the disk in a substantially direct line to the periphery thereof, a support for said scraper and adjustable devices connecting the scraper with said support, said adjustable devices comprising means for adjusting the scraper vertically, and for adjusting said scraper in a direction at right angles to the face of the disk and in a direction parallel with the face of the disk.

2. The combination with a soil-engaging disk and a mounting therefor, of a scraper for said disk, a support for the scraper, universal adjusting devices between the scraper and support, and means affording adjustable connection of said universal adjusting devices with said support.

3. The combination with a soil-engaging disk, a scraper, and a supporting member for the latter, said supporting member having an elongated slot, of an arm on the scraper provided with a head having a curved surface and a slot, a perforated block seated on said supporting member and affording a seat for said head, a bolt passing through the elongated slot of the supporting member, through the hole in said block and through the slot in said head, a nut on said bolt and a sleeve on the bolt between said nut and head.

In testimony whereof I have signed this specification in the presence of two subscribing witnesses.

EDWARD M. HEYLMAN.

Witnesses:
EDWIN NICAR,
GEORGE LAMPHERE.

Copies of this patent may be obtained for five cents each, by addressing the "Commissioner of Patents, Washington, D. C."